United States Patent
Schoenhoff et al.

(10) Patent No.: US 10,533,449 B2
(45) Date of Patent: Jan. 14, 2020

(54) CONTAINMENT FOR A CONTINUOUS FLOW MACHINE

(71) Applicant: MTU Aero Engines AG, Munich (DE)

(72) Inventors: Carsten Schoenhoff, Munich (DE); Rene Schneider, Ottobrunn (DE); Petra Kufner, Poing (DE); Marc Hassler, Olching (DE)

(73) Assignee: MTU Aero Engines AG, Munich (DE)

( * ) Notice: Subject to any disclaimer, the term of this patent is extended or adjusted under 35 U.S.C. 154(b) by 267 days.

(21) Appl. No.: 15/288,138

(22) Filed: Oct. 7, 2016

(65) Prior Publication Data
US 2017/0101887 A1 Apr. 13, 2017

(30) Foreign Application Priority Data

Oct. 8, 2015 (EP) .................................... 15188995

(51) Int. Cl.
*F01D 25/24* (2006.01)
*F01D 21/04* (2006.01)
*B64D 27/16* (2006.01)
*F01D 5/12* (2006.01)
*F01D 9/04* (2006.01)
(Continued)

(52) U.S. Cl.
CPC ............ *F01D 21/045* (2013.01); *B64D 27/16* (2013.01); *F01D 5/12* (2013.01); *F01D 9/041* (2013.01); *F01D 25/24* (2013.01); *F04D 29/321* (2013.01); *F04D 29/526* (2013.01); *F04D 29/542* (2013.01); *F05D 2220/323* (2013.01)

(58) Field of Classification Search
CPC ........ F01D 21/045; F01D 21/04; F01D 25/24; F01D 25/28; F04D 29/40; F04D 29/526; F05D 2240/14; B64D 27/16; B64D 2027/262

USPC ................ 415/199.4, 199.5, 200, 213.1, 224
See application file for complete search history.

(56) References Cited

U.S. PATENT DOCUMENTS 4,762,462 A 8/1988 Lardellier
4,925,365 A 5/1990 Crozet et al.
(Continued)

FOREIGN PATENT DOCUMENTS

CA 2 784 315 A1 9/2011
EP 1 001 140 A2 5/2000
(Continued)

OTHER PUBLICATIONS

European Search Report issued in European counterpart application No. 15188995.3-1610 dated Mar. 31, 2016, with Statement of Relevancy (Nine (9) pages).

*Primary Examiner* — Justin D Seabe
(74) *Attorney, Agent, or Firm* — Crowell & Moring LLP

(57) ABSTRACT

A containment for a continuous flow machine, in particular for a gas turbine, is disclosed. The containment has at least one annular housing with at least one axial section of lesser radial wall thickness and at least one axial section adjacent thereto of greater wall thickness, where the housing is designed and constructed so that the section of greater wall thickness is at a distance in the axial direction of the continuous flow machine from a trailing edge of a guide vane lying downstream in the direction of flow of the continuous flow machine, and extends downstream in the direction of flow of the continuous flow machine over a leading edge of the next downstream guide vane.

11 Claims, 2 Drawing Sheets

(51) Int. Cl.
    *F04D 29/32*     (2006.01)
    *F04D 29/52*     (2006.01)
    *F04D 29/54*     (2006.01)

(56) References Cited

U.S. PATENT DOCUMENTS

| | | | |
|---|---|---|---|
| 5,188,507 A | | 2/1993 | Sweeney |
| 5,336,044 A | * | 8/1994 | Forrester ............... F01D 21/045 |
| | | | 415/196 |
| 5,645,399 A | * | 7/1997 | Angus .................... F01D 11/18 |
| | | | 415/177 |
| 6,290,455 B1 | * | 9/2001 | Hemmelgarn ........ F01D 21/045 |
| | | | 415/173.4 |
| 6,899,339 B2 | * | 5/2005 | Sanders ................ F01D 11/122 |
| | | | 277/355 |
| 7,246,996 B2 | * | 7/2007 | Harris ...................... F01D 5/08 |
| | | | 415/1 |
| 2002/0110451 A1 | | 8/2002 | Albrecht, Jr. et al. |
| 2003/0152456 A1 | * | 8/2003 | Guemmer ............. F01D 5/145 |
| | | | 415/151 |
| 2010/0111675 A1 | * | 5/2010 | Wojtyczka ........... F04D 29/023 |
| | | | 415/119 |
| 2011/0318170 A1 | | 12/2011 | Garin et al. |
| 2012/0134788 A1 | | 5/2012 | Taillant et al. |

FOREIGN PATENT DOCUMENTS

| | | |
|---|---|---|
| EP | 1 508 673 A2 | 2/2005 |
| EP | 2 551 467 A1 | 1/2013 |

\* cited by examiner

CONTAINMENT FOR A CONTINUOUS FLOW MACHINE

This application claims the priority of European Patent Application No. EP 15188995.3 filed Oct. 8, 2015, the disclosure of which is expressly incorporated by reference herein.

BACKGROUND AND SUMMARY OF THE INVENTION

This invention relates to a containment for a continuous flow machine. The invention further relates to a continuous flow machine, an aircraft engine and a calculation method for the design of a containment.

In continuous flow machines, in particular in gas turbines, a structural failure of a component can lead to a penetration of the housing and thus the ejection of a part of this component out of the continuous flow machine by centrifugal force. In particular, in the event of the breakage of a blade of a continuous flow machine, the blades can be ejected at high speed from the housing of the continuous flow machine and then damage machinery and/or injure persons in the vicinity. For this reason, the housing of a continuous flow machine is designed so that it has a wall thickness and therefore a resistance to penetration that can at least largely prevent a penetration of the housing by a part in the event of a structural failure of a component. For this purpose, for example, the housing can be provided with additional parts of a containment and/or can itself be designed as the protective device. A protective device of this type is also called a containment or an engine containment.

EP 2 551 467 A1, for example, describes a housing of a continuous flow machine which is designed so that it has sections of lower radial wall thickness and sections of greater radial wall thickness. The areas of greater radial wall thickness are thereby located in an axial area of the continuous flow machine in which respective blade rows are located. Blade rows of this type are particularly subject to structural failure because they generally rotate at a high rate of speed around an axial longitudinal axis of the flow machine and particularly strong centrifugal forces are exerted on the individual blades.

One disadvantage of a containment of this type is that the sections of greater wall thickness result in corresponding additional weight. However, light weight is important especially when the continuous flow machine is used as an engine. In particular when the continuous flow machine is used as an aircraft engine, the fuel consumption of the corresponding aircraft can be particularly high as a result of a particularly heavy housing or a particularly heavy containment. In the event of an unfavorable axial position of the areas of greater and lesser wall thicknesses, the housing can still be penetrated if, in the event of a structural failure, part of a component impacts an area of lesser wall thickness.

The object of the present invention is therefore to create a containment for a continuous flow machine with which the continuous flow machine is particularly lightweight and safe. An additional object of the present invention is to create a continuous flow machine and an aircraft engine that are each particularly lightweight and safe.

Advantageous configurations with appropriate developments of the invention are disclosed in the individual subclaims, wherein advantageous configurations of the individual devices and of the calculation process are to be considered advantageous configurations of the respective other devices and of the calculation method and vice-versa.

A first aspect of the invention relates to a containment for a continuous flow machine, in particular a gas turbine, with at least one annular housing by means of which a flow chamber of the continuous flow machine can be at least partly bounded radially outwardly and that has at least one axial section with a lesser radial wall thickness and at least one axial section adjacent to it with a greater radial wall thickness. The axial direction is thereby defined by an axial longitudinal axis of the continuous flow machine, in particular by a shaft of the continuous flow machine. The radial direction is accordingly orthogonal to this longitudinal axis. An axial and a radial direction of the protection apparatus are thereby defined by the installation orientation of the containment on the continuous flow machine and thereby correspond to the axial and radial direction of the continuous flow machine.

The containment according to the invention is characterized in that the housing is configured so that the section with a greater wall thickness is at a distance in the axial direction of the continuous flow machine from a trailing edge of a guide vane that lies downstream in the direction of flow of the continuous flow machine and extends downstream in the direction of flow of the continuous flow machine over a leading edge of the next downstream guide vane. In particular, the section of greater wall thickness is at some distance downstream in the axial direction from the trailing edge of the guide vane. The direction of flow is thereby defined by a gas flow through individual stages of the continuous flow machine, in particular by a gas flow through the flow chamber. The direction of flow is conventionally parallel to the longitudinal axis of the continuous flow machine. The guide vanes are each stationary vanes, while the respective rotor blades are rotating blades of the continuous flow machine. The guide vane can also be part of a guide vane ring and correspond to the trailing edge and the leading edge of one edge of the guide vane ring. The flow chamber is a section of the gas turbine through which gas flows, e.g. a compressor, a combustion chamber and/or a turbine.

On known containments for continuous flow machines, it was assumed that individual rotor blades strike the housing in an axial section in which they are located. At the same time, it was assumed that individual guide vanes block a trajectory in the axial direction of a part in the event of a structural failure of a component of the continuous flow machine. Correspondingly, there was no expectation of an impact in the axial sections corresponding to the guide vanes by a part in the event of a structural failure. Therefore no sections of greater wall thickness were provided at that point in the housing. However, it has surprisingly been shown that there can also be an impact of a part with the housing at least in a section of the axial dimension of the guide vanes.

Therefore it is necessary on one hand to extend the section with a greater wall thickness over an axial longitudinal area that is long enough so that it extends to the next guide vane downstream, with an at least partial radial overlap with a rotor blade corresponding to the section of greater wall thickness. It has simultaneously been found that it is not necessary to extend the axial section of greater wall thickness upstream so far that, viewed from the rotor blade corresponding to the section of greater wall thickness, it extends to the next upstream guide vane. Overall, therefore, the axial section with a greater wall thickness is shifted axially downstream compared to known containments. Consequently the containment is particularly safe. Because the possible trajectory of the part in the event of a structural failure is taken into consideration and simulated during the design of the containment, the axial section of greater wall thickness can be adapted particularly effectively to the actual requirements. Thus the axial section of greater wall thickness can extend over a particularly small axial section and consequently the containment can be particularly lightweight.

In individual sections of greater wall thickness at the beginning or end of the continuous flow machine or of an individual section at the beginning or end of a compressor, combustion chamber or turbine, for example, the housing is on the other hand frequently supported and/or protected by surrounding structural components of the continuous flow machine, at least in the terminal area. The continuous flow machine is at that section provided with particular protection against an ejection of parts. Therefore it is precisely in a middle section that the above-mentioned advantageous positioning and/or extension of the axial section of greater wall thickness is particularly important and results in a particularly large savings of weight and/or particularly effective protection.

The section of lesser wall thickness can be also only indirectly adjacent to the section of greater wall thickness. An intermediate area or transitional area can thereby be provided between the sections of lesser wall thickness and greater wall thickness. This intermediate area or transitional area is preferably no longer in the axial direction than 300%, in particular 100%, of the difference in the wall thickness of the section of greater wall thickness and the indirectly adjacent area of lesser wall thickness.

In an additional advantageous configuration of the containment according to the invention, the section of greater wall thickness begins at some distance downstream in the axial direction from the trailing edge of the guide vane and begins at a distance of from 10%, 15%, 20%, 25%, 30%, 35%, 40%, 45%, 50% or 55% to 15%, 20%, 25%, 30%, 35%, 40%, 45%, 50%, 55% or 60%, preferably 20% to 30%, of a cord length of this guide vane. In this manner a particularly safe containment can be created, which is particularly lightweight on account of a particularly late beginning of the axial section of greater wall thickness downstream in the direction of flow.

In an additional advantageous configuration of the containment according to the invention, the section of greater wall thickness, in the axial direction downstream behind the leading edge of the next downstream guide vane, ends with a radial overlap of from 10%, 15%, 20%, 25%, 30%, 35%, 40%, 45%, 50% or 55% to 15%, 20%, 25%, 30%, 35%, 40%, 45%, 50%, 55% or 60%, preferably 20% to 30%, of the cord length of this next guide vane downstream. As a result of this particularly appropriate dimension of the axial section of greater wall thickness in the downstream direction, a penetration of the housing by a part of the component of the continuous flow machine, in the event of a structural failure of the component, can be prevented at least to a large extent in an axial section in which previously there was no protection. It has thereby been demonstrated that in the event of a structural failure, parts can penetrate up to this depth in the axial direction into the axial section of a guide vane ring where they can potentially penetrate the housing. A correspondingly designed containment therefore makes it possible to create a particularly safe continuous flow machine.

In an additional advantageous configuration of the containment according to the invention, the containment has a plurality of sections of greater wall thickness and sections of lesser wall thickness alternating in the axial direction, where the number of sections of greater wall thickness corresponds to a number of rotor blade rings. The rotor blade stages are components that are particularly threatened by structural failure, which can also impact the containment housing with a particularly high level of kinetic energy. A corresponding number of axial sections of greater wall thickness makes possible a particularly appropriate configuration of the housing. In particular, the containment can thus be lightweight and guarantee safe operation of the continuous flow machine.

In an additional advantageous configuration of the containment, there are sections with a lesser wall thickness adjacent to the at least one section of greater wall thickness both upstream and downstream. Sections of lesser wall thickness—given the use of identical materials—are generally lighter in weight than sections of greater wall thickness having the same axial dimension. Accordingly, it is particularly appropriate to limit the section of greater wall thickness to a specific axial section, and then to provide axial sections of lesser wall thickness to reduce weight.

In a further advantageous configuration of the containment according to the invention, the containment has a number of sections of greater wall thickness and sections of lesser wall thickness alternating with each other in the axial direction, where the housing, in an area that at partly forms the radially outer boundary of a turbine section of the continuous flow machine, has a section of greater wall thickness located downstream in the axial direction, the wall thickness of which is greater than in a respective preceding section of greater wall thickness. In other words, the individual wall thickness of the sections of greater wall thickness increases with the direction of flow. As a result, the containment can be particularly lightweight and safe.

In particular on a turbine of the continuous flow machine, the diameter of the individual rotor blade rings increases in the downstream direction. Accordingly, the configuration of the containment described above is particularly effective here. This effect can be reversed on a compressor of the continuous flow machine. In this case the rotor blades lying upstream are subjected to the highest forces and/or loads. Accordingly, it can be appropriate here for the housing, in a section of greater wall thickness lying downstream in the axial direction, to have a lesser wall thickness than in a respective preceding section of greater wall thickness. Therefore, even in a compressor, the configuration of the containment can be optimally adapted to the load. This system thereby applies only for those sections of greater wall thickness that are associated with respective rotor blades fastened to a common shaft. If the continuous flow machine is a multiple-shaft aviation engine, for example, individual sequential rotor blade rings can be located on different shafts and can therefore operate at different speeds of rotation. Therefore the loads and/or forces exerted on these rotor blade rings are no longer proportional to their axial position in the continuous flow machine. Accordingly, at a transition in the axial direction from a rotor blade ring on a first shaft to a rotor blade ring on a second shaft, there can also be a difference in wall thickness between different successive sections of greater wall thickness which does not correspond to their sequence or axial position.

In a further advantageous configuration of the containment according to the invention, the section of lesser wall thickness with the highest wall thickness has a lower wall thickness than the section of greater wall thickness with the lowest wall thickness. The section of greater wall thickness is therefore particularly resistant to penetration, while the section of lower wall thickness can be particularly lightweight.

In a further advantageous configuration of the containment according to the invention, at least one transitional area between the sections of greater wall thickness and the adjacent sections of lesser wall thickness has a surface curvature in a meridian section of the continuous flow machine, wherein the transitional area extends over an axial length of at least 50%, 55%, 60%, 65%, 70%, 75%, 80%, 85%, 90%, 95%, 100%, 105%, 110%, 115%, 120%, 125%, 130%, 135%, 140%, 145%, 150%, 155%, 160%, 165%, 170%, 175%, 180%, 185%, 190%, 195%, 200%, 205%, 210%, 215%, 220%, 225%, 230%, 235%, 240%, 245%, 250%, 255%, 260%, 265%, 270%, 275%, 280%, 285%, 290%, 295%, or 300%, preferably 100%, of a difference between the wall thickness of the section of greater wall thickness and the adjacent section of lesser wall thickness. As a result of a curved transition area of this type, the housing is particularly robust. Otherwise, in the event of abrupt changes in the wall thickness along the radial direction, this could represent a type of weak point in a housing that reduces the containment effect. The section of lesser wall thickness is then only indirectly adjacent to the section of greater wall thickness, because the two sections are separated from one another by the transitional area.

A curved transitional area of this type can also make it possible to create a particularly lightweight and particularly safe containment. In the event of a structural failure, it is also possible that a part will impact the transitional area. In the event of a structural failure, however, this part can have a lower kinetic energy than parts that impact in the axial section of greater wall thickness. Accordingly, the wall thickness in the transitional area can be greater than in the section of lesser wall thickness, although a lesser wall thickness is necessary than in the section of greater wall thickness. As a result of the presence of a transitional area with the surface curvature in a meridian section of the flow machine, the wall thickness of the housing can be designed in a manner particularly appropriate to the needs of the specific situation.

In an additional advantageous configuration of the containment according to the invention, the housing, in the section of lesser wall thickness and/or the section of greater wall thickness, can have a constant wall thickness over its axial dimension. Sections of the housing with a constant wall thickness are particularly simple and economical to fabricate.

In an additional advantageous configuration of the containment of the invention, the section of greater wall thickness and the section of lesser wall thickness can be formed jointly by one housing element of the housing. The different sections of lesser wall thickness and greater wall thickness can therefore be integrated into a single component. The fabrication of a housing of this type can be particularly economical and a housing of this type is particularly simple to assemble and install.

In an additional advantageous configuration of the containment according to the invention, the section of lesser wall thickness is formed by a housing element, and the section of greater wall thickness is formed by the housing element and at least one additional element located on it. The additional element can be in the form of a retaining ring, for example. The housing element can therefore be particularly easy to design, in particular with a continuous and essentially constant wall thickness. For example, additional elements can be replaced if they become damaged. The containment designed in this matter is therefore particularly easy to service and repair.

In an additional advantageous configuration of the containment according to the invention, the at least one additional element is made of a material that is different from that of the housing element. In the axial section of greater wall thickness, individual material characteristics can thereby be particularly well adapted to the specific requirements in the event of a structural failure. In particular, a material can be used that has a particularly high resistance to impacts by a part in the event of a structural failure. The containment can thus be particularly lightweight and/or particularly safe. For example, the additional element can be made of a ceramic material. In particular, the additional element can be in the form of a ceramic retaining ring. Alternatively or in addition, the additional element can also comprise a composite fiber material, for example. On the other hand, the housing element can be made of a metal alloy.

A second aspect of the invention relates to a continuous flow machine with at least one guide vane ring, at least one rotor blade stage and with at least one containment. The containment according to the invention is a containment according to the first aspect of the invention. The features and advantages that result from the use of the containment according to the first aspect of the invention are presented in the descriptions of the first aspect of the invention, where advantageous configurations of the first aspect of the invention are to be considered advantageous configurations of the second aspect of the invention and vice versa.

A third aspect of the invention relates to an aviation engine with a continuous flow machine according to the second aspect of the invention or with a containment according to the first aspect of the invention. The resulting particularly low weight is advantageous especially on an aviation engine because the fuel consumption of an aircraft can be kept particularly low. Moreover, the containment of an aviation engine must be particularly safe, because a penetration of the housing can have particularly serious consequences. The features and advantages resulting from the use of the containment according to the first aspect of the invention and/or from the use of the continuous flow machine according to the second aspect of the invention are presented in the descriptions of the first and second aspects of the invention, where the advantageous configurations of the first and second aspects of the invention are to be considered advantageous configurations of the third aspect of the invention and vice versa.

Additional advantages, features and details of the invention are presented in the following description of one preferred exemplary embodiment and with reference to the accompanying drawings. The features and combinations of features cited in the above description and in the following description of the Figures and/or the features and combination initiatives or features found only in the Figures can be applied not only in the respective indicated combinations, but also in other combinations or individually, without thereby going beyond the framework of the invention.

DETAILED DESCRIPTION OF THE DRAWINGS

Figure 1:
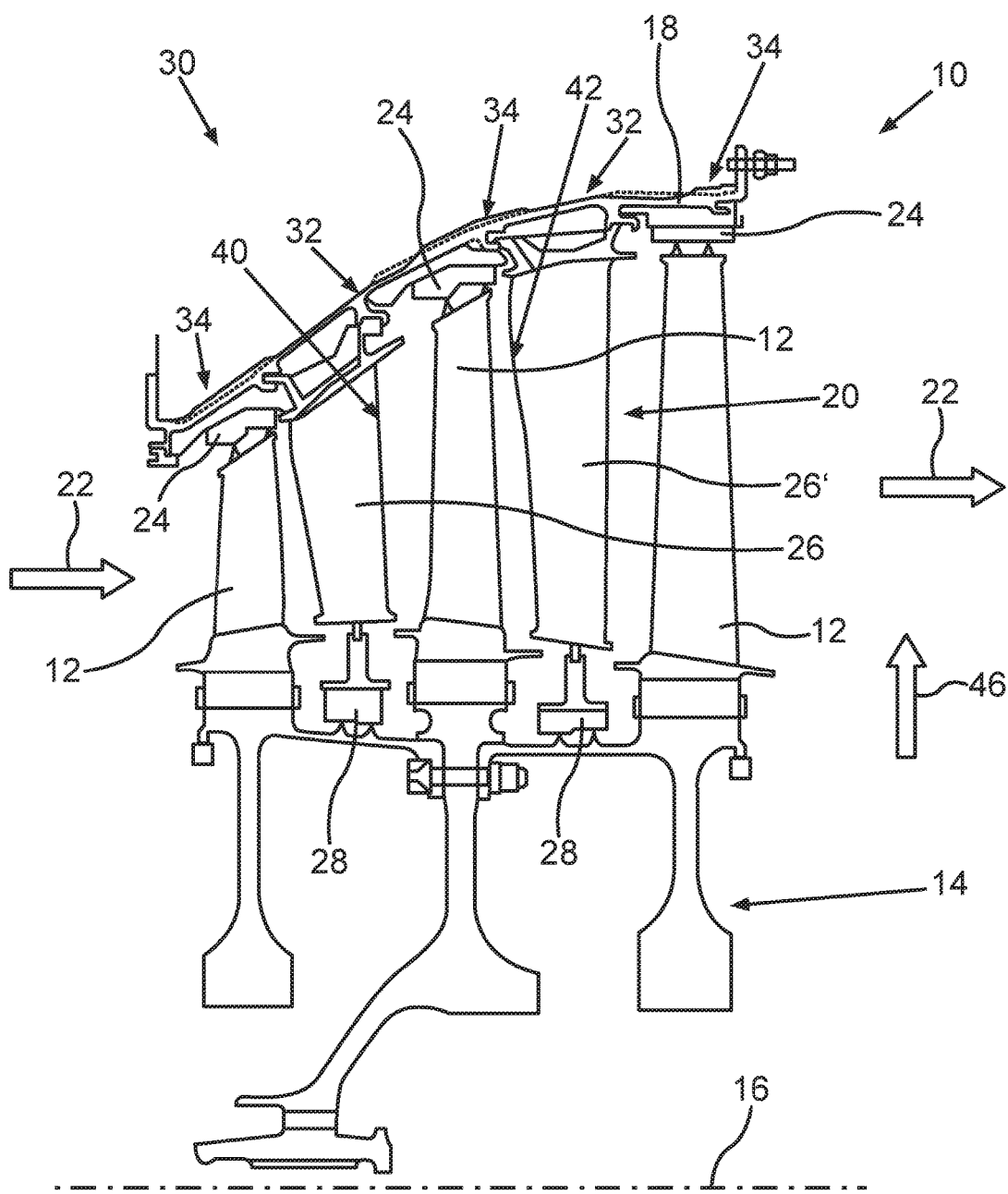
FIG. 1 is a detail showing a schematic meridian sectional view of a continuous flow machine with one configuration of the containment according to the invention.

FIG. 1 shows a detail of a continuous flow machine 10 in a meridian sectional view. This continuous flow machine 10 can be a gas turbine of an aviation engine, for example. The detail of the continuous flow machine 10 shown in FIG. 1 shows at least a portion of the turbine of the continuous flow machine 10. Individual rotor blades 12 are fastened to a common shaft that extends along the center axis 16 and is not shown in the Figures. The individual rotor blades 12 are located on rotor discs that are connected to one another. The shaft, with its center axis, defines the axial longitudinal direction of the continuous flow machine 10. The longitudinal axis of the continuous flow machine 10—and therefore also of its containment 30—is indicated by the broken line 16 in FIG. 1 and FIG. 2.

A flow chamber 20 is defined primarily by the radial inner and outer terminal end walls of the rotor blades 12 and the respective guide vanes 26. During the operation of the continuous flow machine 10 a gas current flows through this flow chamber 20, where the direction of flow is indicated by the arrows 22 in FIG. 1 and FIG. 2. The rotor blades 12 are driven by the gas current and the turbine thereby recovers energy from the gas flow. Respective inlet port linings 24 are provided between the rotor blades 12 and the housing 18. The inlet port linings 24 make it possible to connect the rotor blades 12 with the housing 18 in a particularly gas-tight manner. Also fastened to the housing 18 are respective guide vanes 26 that also project into the flow chamber 20. By means of the guide vanes 26, the gas flow is directed through the flow chamber 20, as a result of which the turbine is particularly efficient. Additional inlet port linings 28 are located between the guide vanes 26 and the rotor discs 14. The guide vanes 26 can thereby be connected in a particularly gas-tight manner with the rotor discs 14, as result of which the efficiency of the continuous flow machine 10 is also particularly high.

Therefore the rotor blades 12 rotate on the shaft inside the flow chamber 20 around the center axis of the continuous flow machine 10 indicated by the broken line 16. The guide vanes 26, on the other hand, are fastened in a stationary manner to the housing 18 and do not rotate inside the flow chamber 20.

Figure 2:
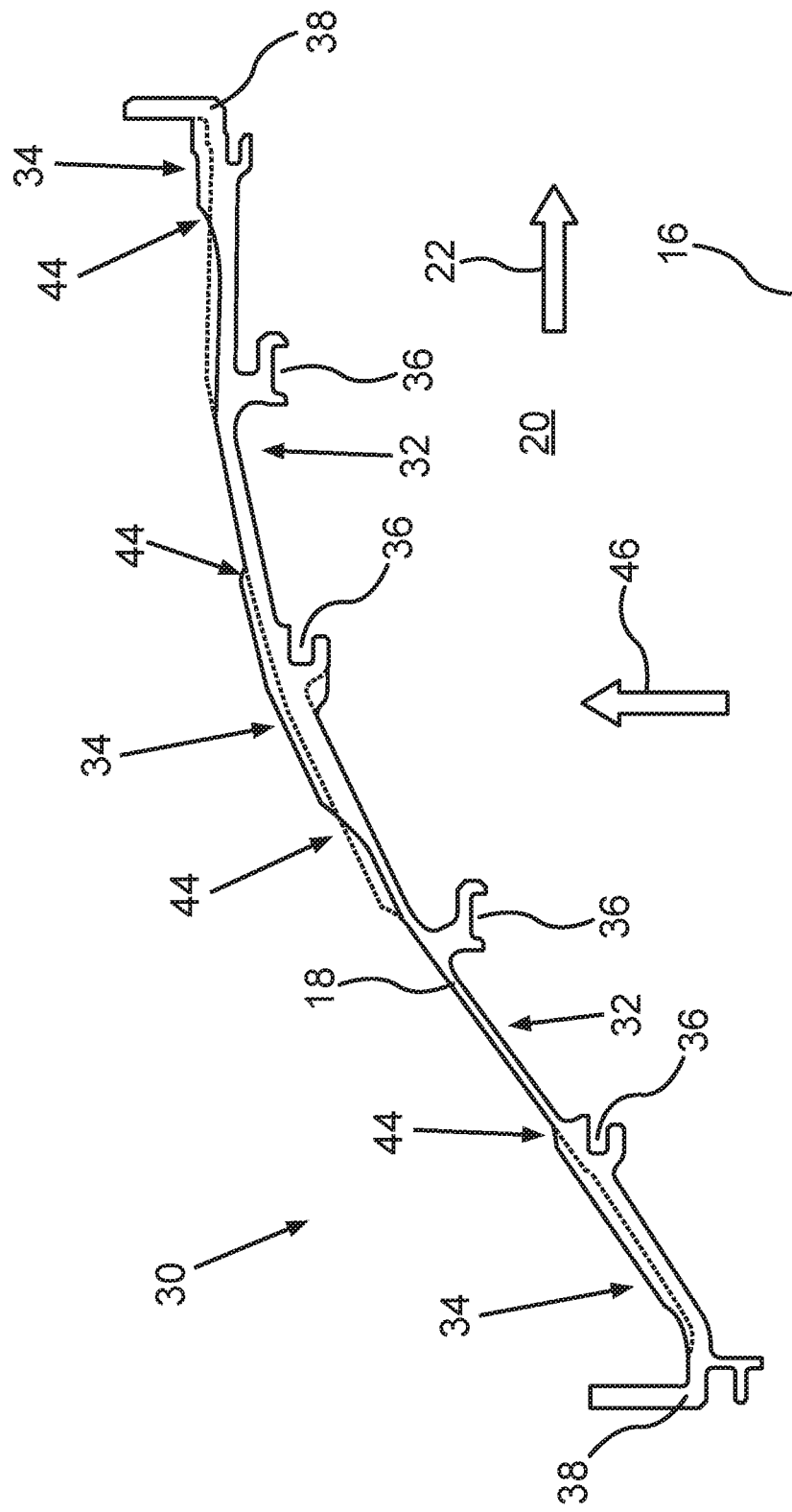
FIG. 2 is a schematic meridian sectional view through the containment according to the invention illustrated in FIG. 1.

The continuous flow machine 10 thereby comprises the containment 30, which is shown in the schematic meridian sectional view in FIG. 2 without additional components of the continuous flow machine 10. The containment 30 comprises at least the annular housing 18. By means of this annular housing 18, the flow chamber 20 of the continuous flow machine 10 can be at least partly bounded radially outwardly. The direction "radial outer" is thereby orthogonal to the longitudinal axis of the continuous flow machine 10 and is indicated in FIG. 1 and FIG. 2 by the arrow 46. In the event of a structure failure of a rotating component of the continuous flow machine 10, a penetration of the housing 18 by a part of this component is to be at least largely prevented by means of the containment 30. This containment is also called an engine containment.

The housing 18 has a plurality of axial sections 32 of lesser radial wall thickness and adjacent axial sections 34 of greater radial wall thickness. The housing 18 also has connection points 36 for the fastening of the guide vanes 26 to the housing 18. The housing 18 further has individual fastening points 38 for fastening to the rest of the continuous flow machine 10.

In both FIG. 2 and in FIG. 1, the embodiment of the containment 30 described here is indicated by a solid line. On the other hand, the modifications of the containment 30 with respect to the prior art are illustrated by showing the areas of the prior art that differ from the embodiment of the containment 30 described here in broken lines.

In the prior art, the sections 34 of greater radial wall thickness correspond in their axial dimension to the axial dimension of respective guide vanes 26. In other words, the section 34 of greater wall thickness according to the prior art extends in the axial direction of the continuous flow machine 10 from a trailing edge of a guide vane 26 closest upstream in the axial direction of the section 34 of greater wall thickness of the continuous flow machine downstream to the leading edge of a closest downstream guide vane 26'. The wall thickness of the axial section 34 was calculated in the design phase of the prior art using what was called an energy balance method. It was also assumed that in the event of a structural failure of the rotor blades 12, individual parts could not penetrate the guide vanes 26, nor could they impact the housing 18 in an axial section that corresponds to the respective guide vanes 26.

One disadvantage of this design is that the axial section 34 with a greater wall thickness extends over a particularly large section of the housing 18. The housing 18 is therefore particularly heavy. It has also been shown that parts can impact the housing 18 in an area at least partly in the axial extension of the guide vanes 26. In the event of a structural failure, parts can be diverted outward by the guide vanes 26 and/or the rotor blades 12 on a diagonal trajectory with an axial and a radial component. In other words, a trajectory of these parts in the axial direction is not completely blocked by a guide vane 26.

For this reason, the invention teaches the containment 30, the configuration of which is illustrated by solid lines, as a result of which the differences from the prior art are immediately apparent. The housing 18 is thereby designed so that the section 34 with a greater wall thickness is at some distance in the axial direction of the continuous flow machine 10 from a trailing edge of a guide vane 26 lying downstream in the direction of flow of the continuous flow machine 10 and extends downstream in the direction of flow of the continuous flow machine 10 over a leading edge of the next downstream guide vane 26'. A corresponding trailing edge is marked by the number 40 by way of example in FIG. 1 for the middle section 34 of greater wall thickness. A corresponding leading edge is marked by the number 42 in FIG. 1. In the respective axial sections 34 of greater wall thickness that are located at the beginning or end of the continuous flow machine 10 or of the turbine illustrated in FIG. 1 there is no next rotor blade 26' or preceding guide vane 26.

In this case the dimension is defined by the respective end of the continuous flow machine 10, respective rotor blades 12, guide vanes 26 and/or of the housing 18. Section 34 with a greater wall thickness in a terminal area of the continuous flow machine 10 or of the housing 18 can therefore extend in the axial direction of the continuous flow machine 10 from the terminal area of the continuous flow machine 10 or of the housing 18 to, at some distance downstream in the direction of flow of the continuous flow machine 10, a trailing edge of a next guide vane upstream in the axial direction of the flow machine 10 or downstream to behind the leading edge of the next downstream guide vane 26'.

It is clearly apparent in comparison to the prior art that the sections 34 with a greater wall thickness are displaced essentially axially downstream in the direction of flow in comparison to the prior art. As a result, the containment 30 is particularly safe, because the axial positions of the sections 34 of greater wall thickness now correspond better to the actual expected impact areas of parts in the event of a structural failure. The respective sections 32 of lesser wall thickness also now extend over a greater axial area of the housing 18. Consequently the containment 30 is particularly lightweight.

In the example illustrated in FIGS. 1 and 2 the beginning of the section 34 of greater wall thickness in the axial center of the housing 18 is located at some distance downstream from the trailing edge, marked as 40, of the guide vane 26 at a distance of approximately 20% to 30% of the chord length of this guide vane 26. The same section 34 with a greater wall thickness ends in the axial direction downstream behind the leading edge, marked as 42, of the next downstream guide vane 26' with a radial overlap of 20% to 30% of a chord length of this next downstream guide vane 26'.

The number of axial sections 34 with a greater wall thickness thereby corresponds to the number of rotor blade stages or the illustrated number of rotor blades 12. In the example illustrated in FIG. 1 and FIG. 2, therefore, there are three axial sections 34 of greater wall thickness. The axial sections 32 of lesser wall thickness, on the other hand, correspond to the number of guide vane stages or the illustrated number of guide vanes 26. In the example illustrated in FIG. 1 and FIG. 2, therefore, there are two axial sections 32 of lesser wall thickness. This plurality of sections 34 of greater wall thickness and sections 32 of lesser wall thickness adjacent to each other in the axial direction alternate with each other in the axial direction.

The housing 18 has, in a section 34 of greater wall thickness that lies downstream in the axial direction, a greater wall thickness than in a preceding section 34 of greater wall thickness. The radial diameter of the respective rotor blades 12 increases downstream in the direction of flow. Because the rotor blades 12 and different rotor blade stages are all fastened to the same shaft, they all rotate at the same speed of rotation.

Between the sections 34 of greater wall thickness and the adjacent sections 32 of lesser wall thickness, the housing 18 has at least one transitional area 44 with a surface curvature in a meridian section, i.e., a section with a sectional plane that contains the axis of rotation as illustrated in FIGS. 1 and 2. The transitional area 44 thereby extends over an axial length of from 50% to 300% of a difference of the wall thickness of the section 34 with a greater wall thickness and the adjacent section 32 with a lesser wall thickness. That produces a transitional area 44 with a slight curvature. Consequently, the containment 30 is particularly safe. If the curvature were too great and/or the radii too small, creating excessively acute angles in the transitional area 44 of the housing 18, design failure points would be created that would structurally weaken the housing 18.

The sections 34 of greater wall thickness and the sections 32 of lesser wall thickness are together formed by a housing element of the housing 18. The sections 34 of greater wall thickness and the sections 32 of lesser wall thickness are therefore fabricated so that they are integrated into a common part. The housing 18 can therefore be manufactured particularly economically. That also makes the assembly of the containment 30 particularly economical. Alternatively, the sections 34 of greater wall thickness can be formed by at least one additional element located on the housing element. For example, additional elements can be attached, specifically by means of adhesive, to the inside and/or outside of the housing 18, such as ceramic rings and/or composite fiber rings, to form the section 34 of greater wall thickness. The housing 18 can consequently be further reinforced in the sections 34 of greater wall thickness by the use of another material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE CHARACTERS

10 Continuous flow machine
12 Rotor blades
14 Rotor disc
16 Broken line
18 Housing
20 Flow chamber
22 Arrow
24 Inlet port lining
26 Guide vane
26' Guide vane
28 Inlet port lining
30 Containment
32 Section of lesser wall thickness
34 Section of greater wall thickness
36 Connection point
38 Fastening point
40 Trailing edge
42 Leading edge
44 Transitional area
46 Arrow

What is claimed is:

1. A containment for a gas turbine, comprising:
an annular housing, wherein a flow chamber of the gas turbine is at least partly bounded radially outwardly by the annular housing, wherein the annular housing has a first axial section and a second axial section, wherein the first axial section is adjacent to the second axial section, and wherein the second axial section has a greater radial wall thickness than the first axial section;
wherein the second axial section is disposed at a distance in an axial direction of the gas turbine from a trailing edge of an upstream first guide vane in a direction of flow and extends downstream in the axial direction over a leading edge of a next downstream second guide vane in the direction of flow and wherein the second axial section overlaps a rotor blade disposed between the upstream first guide vane and the next downstream second guide vane;
wherein a transitional area is disposed between the first axial section and the second axial section, wherein the transitional area has a surface curvature, and wherein the transitional area extends over an axial length of at least 50% of a difference between a wall thickness of the second axial section and the first axial section;
wherein the containment has a plurality of second axial sections and a plurality of first axial sections, wherein the plurality of second axial sections alternate in the axial direction with the plurality of first axial sections, and wherein a number of the plurality of second axial sections is equal to a number of rotor blade stages.

2. The containment according to claim 1, wherein the second axial section begins at the distance from the trailing edge and wherein the distance is 10% to 60% of a chord length of the first guide vane.

3. The containment according to claim 1, wherein the second axial section ends behind the leading edge with a radial overlap of 10% to 60% of a chord length of the second guide vane.

4. The containment according to claim 1, wherein a one of the plurality of second axial sections located downstream in the direction of flow has a greater wall thickness than another one of the plurality of second axial sections located upstream in the direction of flow.

5. The containment according to claim 1, wherein a one of the plurality of first axial sections with a greatest wall thickness has a lesser wall thickness than a one of the plurality of second axial sections with a lowest wall thickness.

6. The containment according to claim 1, wherein the first axial section and/or the second axial section has a constant wall thickness in the axial direction.

7. The containment according to claim 1, wherein the first axial section and the second axial section are formed jointly by a housing element of the annular housing.

8. The containment according to claim 1, wherein the first axial section is formed by a housing element and wherein the second axial section is formed by the housing element and an element disposed on the housing element.

9. The containment according to claim 8, wherein the element is made of a different material than the housing element.

10. A continuous flow machine comprising at least one guide vane ring, at least one rotor blade stage, and at least one containment according to claim 1.

11. An aircraft engine comprising a continuous flow machine according to claim 10.

* * * * *